United States Patent [19]

Menichini

[11] Patent Number: 5,006,386
[45] Date of Patent: Apr. 9, 1991

[54] RESILIENT POLE-GUARD

[75] Inventor: Frank A. Menichini, Bryn Mawr, Pa.

[73] Assignee: Custom Pack, Inc., Malvern, Pa.

[21] Appl. No.: 365,174

[22] Filed: Jun. 12, 1989

[51] Int. Cl.⁵ .................... B32B 3/00; E04C 3/34; F16L 9/00
[52] U.S. Cl. .................... 428/58; 428/36.9; 428/98; 428/99; 428/121; 428/126; 428/131; 428/158; 428/167; 428/188; 428/192; 138/118.1; 138/120; 138/155; 138/117; 52/727; 52/728; 52/731; 267/141; 248/345.1
[58] Field of Search .................... 428/34.1, 36.9, 156, 428/192, 92, 58, 98, 99, 119, 121, 124, 126, 131, 158, 167, 188; 138/118.1, 120, 155, 128, 156, 157, 167, 140, 107, ; 52/727, 728, 593, 595, 731; 267/140, 141, 136; 248/345.1

[56] References Cited

U.S. PATENT DOCUMENTS

| | | | |
|---|---|---|---|
| 3,092,529 | 6/1963 | Pearson | 138/157 |
| 3,212,529 | 10/1965 | Ullman et al. | 138/157 |
| 3,251,382 | 5/1966 | Tatsch | 138/157 |
| 3,410,474 | 11/1968 | Keil | 52/594 |
| 3,939,665 | 2/1976 | Gosse | 52/728 |
| 4,453,353 | 6/1984 | Killop et al. | 52/728 |
| 4,748,060 | 5/1988 | Fry | 428/36.9 |

Primary Examiner—Ellis P. Robinson
Assistant Examiner—Donald J. Loney
Attorney, Agent, or Firm—Benasutti

[57] ABSTRACT

A sheathing for extending members having either a rectangular cross section or a circular cross section is formed of sheathing sections wherein the sheathing sections have two positions. In a first substantially flat position the sheathing sections are convenient to stack and when stacked the surfaces of adjacent stacked sheathing sections are substantially in contact with each other. In a second folded position the sheathing sections define an enclosed hollow space for disposing an extending member therein and surrounding the extending member to protect vehicles or other objects striking the extending member. Articulating hinges are provided for transposing the sheathing sections from one of these positions to the other. The sheathing sections are provided with dove tailing interengagement for joining sections of the sheathing to each other. Inserts brace the walls of the sheathing against extending members inside the space defined by joined sections.

3 Claims, 4 Drawing Sheets

RESILIENT POLE-GUARD

BACKGROUND OF THE INVENTION

1. FIELD OF THE INVENTION

This invention relates to sheathing for poles and similar extending members for protecting vehicles when vehicles strike these poles and extending members and more particularly to sheathing which is generally suitable for various extending members having either rectangular or circular cross sections and which may be easily stacked for packaging and shipping prior to use and easily assembled for use.

2. PRIOR ART

It is known in the art to insulate pipe members and other tubular or extending members by wrapping insulating material, such as mineral wool, in sheets around the member to form a lining around the pipe or tube to be insulated and covering the lining by a final wrapping of moisture impermeable material, such as asphalt coated paper, canvass tape, etc. Furthermore, it is also known to form a cylindrical sleeve around pipe members and tubular members from foam plastic which has been divided along a line or lines, whereupon the part cylinder sleeve members obtained thereby can be arranged around the pipe or tube to be insulated and can be secured by means of separate fastening parts or integral fastening parts. The separate fastening parts may comprise an outer wrapping such as asphalt coated paper or canvass tape laid around the outer circumference of the cylinder sleeve.

Thus sheaths were formed of a insulating pipe covering which comprised substantially identical hollow semi-cylindrical sections of a substantially rigid cellular plastic material. The sections were oriented to cooperatively define a hollow cylindrical element having a longitudinal axis. The cylindrical element was adapted for accommodating a pipe therein, with the semi-cylindrical sections in contact with the pipe or tube. Interengagement between undercut tongues and grooves in the sections could connect the sections securely to each other. Such an arrangement was disclosed in U.S. Pat. No. 3,126,035 issued to Espetvedt on Mar. 24, 1964.

However, sheathing for protecting pipe members and similar tubular members of the type taught by Espetvedt was not efficiently stackable for packing and shipping because of the semi-circular shape of the sheathing sections. The outer radius of one section of the semi-cylindrical sheathing did not fit within the inner radius of another section of the semi-cylindrical sheathing, thereby wasting space between sections because the surfaces of adjacent sections during stacking were not in contact with each other. This prevented efficient stacking of the sections for the purpose of packaging and shipping. Additionally, the semi-cylindrical sheathing sections were only adapted for effectively surrounding cylindrical members. Extending members which were not cylindrical, for example I-beams or other types of extending members having rectangular cross sections, required a different kind of sheath. Thus prevented the efficiency which would result from having a single type of sheath for both shapes of extending members, those with rectangular cross sections and both those with circular cross sections.

A method for producing conventional continuous tubular foamed plastic pipe sleeves is taught in U.S. Pat. No. 4,087,501 issued to Moser on May 2, 1978. The semi-cylindrical sleeve sections produced by this method could be joined to surround a pipe member or tubular member.

Protective padding which was flat and easily stackable for efficient packaging, storing, and shipping is taught in Keil, U.S. Pat. No. 3,410,474, issued Nov. 12, 1968. The invention in the art of packaging taught by Keil comprised protective padding assembled from three identical modules to be held together by dove tail tongue and groove joints, each module containing an extending dove tail tongue and a recessed dove tail groove. The extending dove tail tongue of the first module fitted into the recessed dove tail groove of the second module, the dove tail tongue of the second module fitted into the dove tail groove of the third module, and the dove tail tongue of the third module fitted into the dove tail groove of the first module.

Because, all three of the modules taught by Keil were completely flat they could be easily stacked for packaging and shipping. Furthermore, because they were made of a resiliently compressible, shock absorbent material such as polyethelene, when they locked together they formed very effective padding for protecting objects from impact with the protected member. However, the three modules of Keil could only be fitted together to provide protective padding for a single corner of an object and could not be used to form a structure which could surround pole members and tubular members and other extending members to sheath such extending members and to protect vehicles when the vehicles struck the pole members and tubular members.

Both U.S. Pat. No. 3,181,849, issued to Mitchell on May 5, 1965, and U.S. Pat. No. 3,936,040, issued to Wilson on Feb. 3, 1976, taught protective padding which surrounded an extending member such as a pipe member or tubular member for protecting bodies which struck the pipe member or tubular member. The shock absorbing guard of Mitchell was adapted for areas in sports arenas and the like to prevent injuries to people who hit extending tubular members such as the supports for a basketball backboard. The device taught by Wilson required rigid plates to be woven into a molded surface layer of a guard which was planar. The molded guard was then wrapped around a pipe member or tubular member to be protected. The resilient guard of Wilson was bolted onto the extending member.

Therefore it is the object of this invention to provide a sheathing for extending members such as pipe members, tubular members, and members having a rectangular cross section for protecting the sheathed extending members from vehicles when vehicles strike the extending members.

It is a further object of the invention to provide a sheathing for extending members such as pipe members, tubular members and extending members having a rectangular cross section which may be efficiently stacked for packaging and shipping without wasted space between adjacent stacked sheathing sections.

It is a further object of the invention to provide a sheathing for extending members such as pipe members, tubular members and extending members having a rectangular cross section to protect the sheathed extending member when vehicles strike the extending member in which the sheathing is easily assembled for use.

Finally it is an object of the invention to provide a single sheathing for protecting both extending members having a rectangular cross section and extending members having a circular cross section.

SUMMARY OF THE INVENTION

A sheathing for extending members having either a rectangular cross section or a circular cross section is formed of sheathing sections wherein the sheathing sections have two positions. In a first substantially flat position the sheathing sections are convenient to stack and when stacked the surfaces of adjacent stacked sheathing sections are substantially in contact with each other. In a second folded position the sheathing sections define an enclosed hollow space for disposing an extending member therein and surrounding the extending member to protect vehicles or other objects striking the extending member. Articulating hinges are provided for transposing sections from one of these positions to the other. The sheathing sections are provided with dove tailing interengagement for joining sections of the sheathing to each other. Inserts brace the walls of the sheathing against extending members inside the space define by joined sections.

DETAILED DESCRIPTION OF INVENTION

Figure 1:
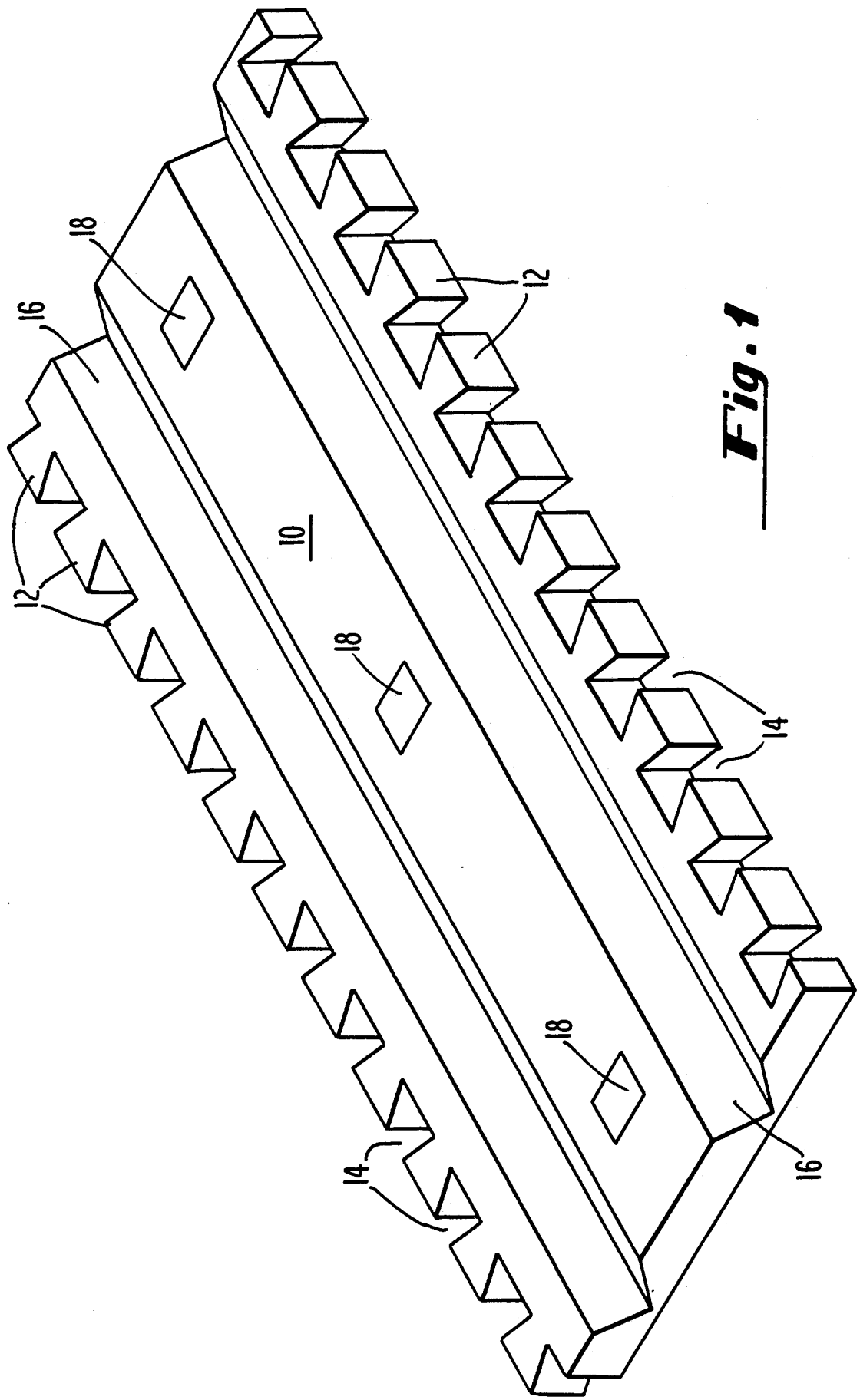
FIG. 1 shows the sheathing section of the present invention.

Referring now to FIG. 1 there is shown, resilient pole guard section 10 of the present invention. Resilient pole guard section 10 of the present invention is a sheathing section formed from a substantially flat rectangular piece of material chosen to have a certain degree of resilience but also chosen to be sufficiently rigid to protect a vehicle or other object when the vehicle or other object strikes a pole member or tubular member or other type of extending member sheathed by resilient pole guard section 10.

In order to easily install the protective sheathing provided by the present invention, the preferred embodiment of the sheathing comprises two separate resilient pole guard sections 10 which, when assembled, define together an axially extending central hollow space for concentrically disposing therein the pole member, tubular member, or other extending member to be sheathed. Although the preferred embodiment comprises such an axially extending central hollow space or cavity formed by joining two resilient pole guard sections 10, it will be understood by those skilled in the art that a sheath may be formed of any number of sections.

To facilitate the joining of resilient pole guard sections 10, resilient pole guard section 10 is provided with a plurality of interleaved recessed dove tail grooves 14 which extends inwardly toward the center of resilient pole guard section 10 and a plurality of outwardly extending dove tail tongues 12. This series of interleaved recessed dove tail grooves 14 and outwardly extending dove tail tongues 12 are provided on each of the opposing longitudinal edges of resilient pole guard section 10.

Resilient pole guard section 10 is also provided with two hinge forming channels 16 which extend longitudinally from one end of resilient pole guard section 10 to the other end of resilient pole guard section 10, for articulating resilient pole guard section 10 back and forth between a flat position and a folded position. Resilient pole guard section 10 can be folded along hinge forming channels 16 to form two ninety degree corners, one ninety degree corner at the apex of each hinge forming channel 16.

Therefore resilient pole guard section 10 has both a flat position and a folded position. In the flat position a plurality of the resilient pole guard sections 10 can be efficiently stacked adjacent each other. When resilient pole guard sections 10 are thus adjacently stacked, the surfaces of adjacent pole guard sections 10 are substantially in contact with each other. This contact between the surfaces of adjacent pole guard sections 10 avoids the wasted space associated with the stacking of sheathing wherein space remains between adjacent sections because the surfaces of adjacent sections are not substantially in contact with each.

For example, in the case of semicircular sections, when the semicircular sections are stacked adjacent other, space remains between adjacent sections and the surfaces of adjacent sections are not substantially in contact with each other since the inner radius and the outer radius of the semicircular sections are of different sizes and the larger radius can not fit within the smaller radius. In addition to stacking efficiently when resilient pole guard sections 10 are in the flat position, when resilient pole guard sections 10 are in the folded position they can be mated to define a space for enclosing an extending member, such as a pipe member or a tubular member or a beam. Thus mated or interengaged pole guard sections 10 can sheath an extending member or beam thereby protecting an object striking the extending member.

Figure 2:
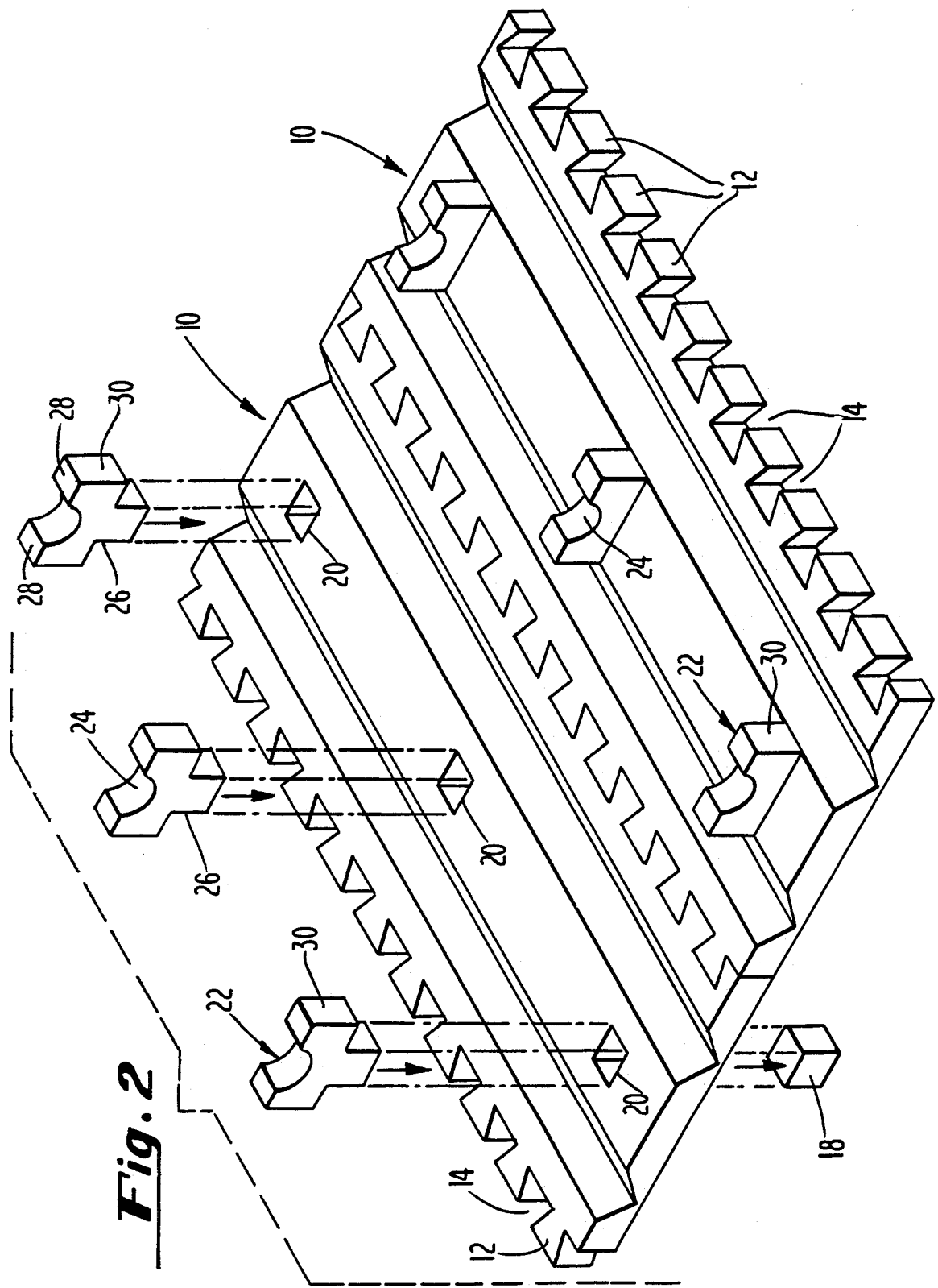
FIG. 2 shows two sheathing sections of the present invention as shown in FIG. 1 joined together along a single longitudinal seam.

Referring now to FIG. 2, there is shown an unarticulated sheath for pipe members, tubular members or other types of extending members wherein the extending member can be effectively sheathed whether the extending member is formed with a rectangular cross section or with a circular cross section. The unarticulated sheath is formed from two resilient pole guard sections 10 by matingly interlocking two resilient pole guard sections 10 along a sea formed by respective rows of interleaved dove tail grooves 14 and dove tail tongues 12. When two resilient pole guard sections 10 are being interlocked, dove tail tongues 12 compress somewhat in order to facilitate entry into dove tail grooves 14 and thereby facilitate interengagement of dove tail grooves 14 and dove tail tongues 12. When dove tail grooves 14 and dove tail tongues 12 are matingly interlocked in this manner, they form a strong seam to securely attach a plurality of resilient pole guard sections 10 to each other.

Resilient pole guard sections 10 are also provided with holes 20 filled with knock out plugs 18. Plugs 18 may be removed from holes 20 of resilient pole guard section 10 to permit insertion of shaft 26 of insert 22 or brace 22 into hole 20 thereby firmly securing and friction fitting insert 22 to resilient pole guard section 10. The material of shaft 26 of insert 22, as well as the material of resilient pole guard section 10 surrounding holes 22, resiliently compress some what during the insertion of shaft 26 into a hole 22 to facilitate such insertion.

At the end of insert 22 opposite shaft 26, insert 22 is formed with a semi-circular channel 24. Two semicircular channels 24 act cooperatively to receive and press against a pipe member or other extending member within the axially extending central hollow space defined when interconnected resilient pole guard sections 10 are transposed into the folded position by articulating pole guard sections 10 at hinge forming channels 16. Thus sheathing formed of resilient pole guard sections 10 with braces 22 is firmly secured around extending members having circular cross-sections.

When two resilient pole guard members 10 are thus joined together by interlocking dove tail grooves 14 and dove tail tongues 12 along the two longitudinal seams folded along all four hinge forming channels 16, and inward facing surfaces 28 of two opposing inserts 22 abut each other and semicircular channels 24 of two opposing inserts 22 join to cooperatively form a ring for surrounding a sheathed pipe member or tubular member, resilient pole guard sections 10 are adapted for extending members having circular cross-sections.

In this arrangement, side faces 30 of inserts 22 press against the inner surface of one of the walls of the sheath formed by pole guard sections 10 to surround the pipe member or tubular member. The inner walls of pole guard sections 10 which press against faces 30 of insert 22 are those walls having interengagement seams between joined resilient pole guard sections 10. The seams are formed by matingly engaging and interlocking dove tail grooves 14 and dove tail tongues 12 of the two interengaged pole guard sections 10.

Figure 4:
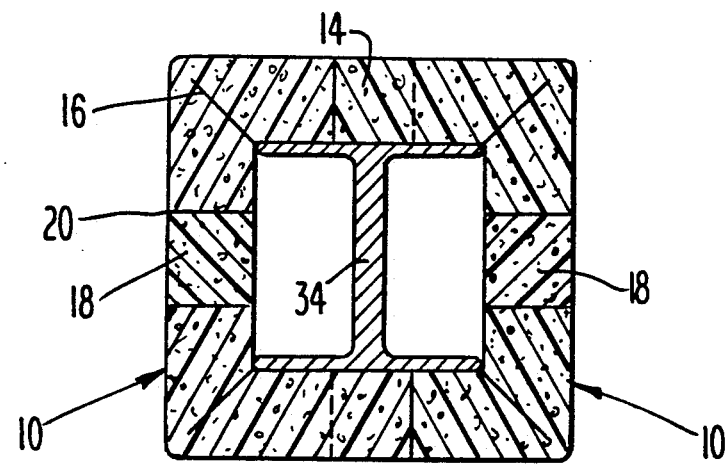
FIG. 4 shows a cross-sectional representation of the sheathing of the present invention joined together along two longitudinal seams to surround the I-beam member of FIG. 3.
Figure 3:
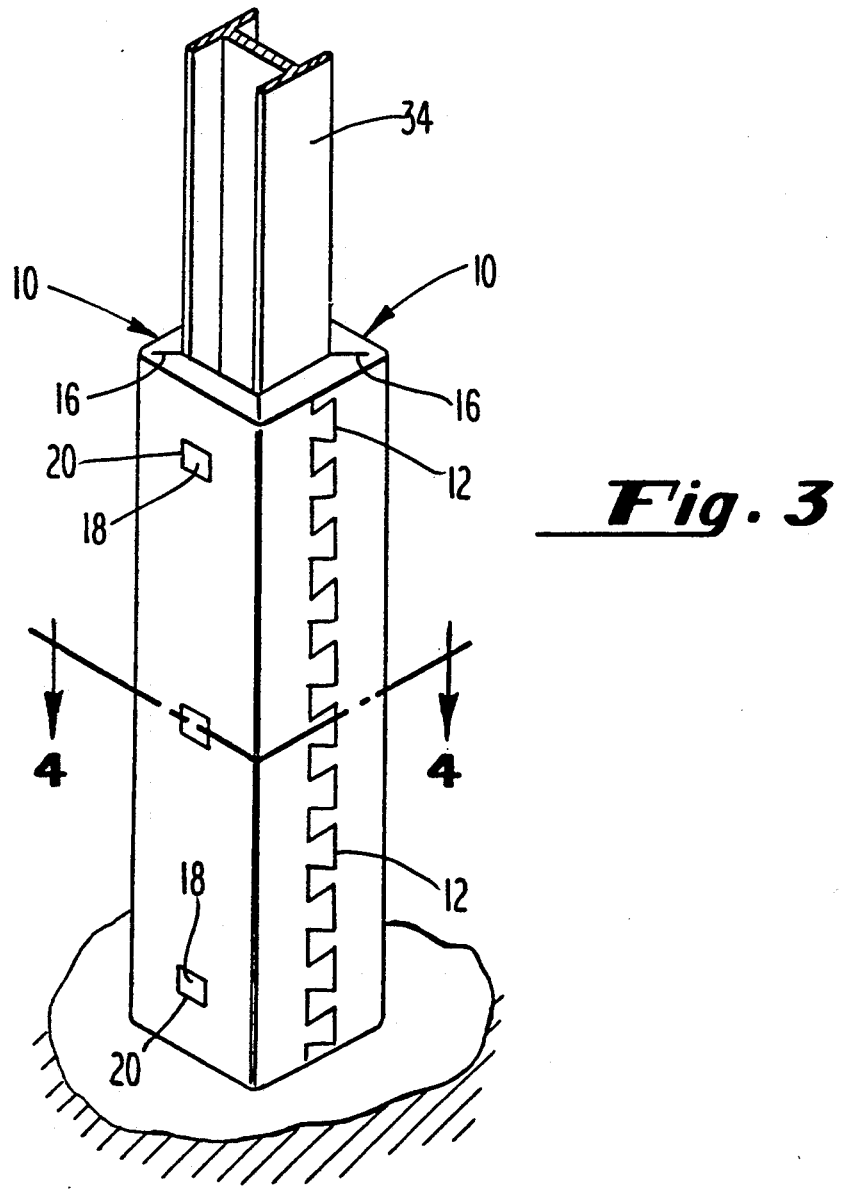
FIG. 3 shows two sheathing sections of the present invention as shown in FIG. 1 joined together along two longitudinal seams to surround an I-beam extending member having a rectangular cross section.

Referring now to FIGS. 3, 4, there is shown a perspective representation of sheathing formed of two resilient pole guard sections 10 joined together along longitudinal seams to surround an extending I-beam member 34 and a cross sectional representation of two resilient pole guard sections 10 joined together and surrounding I-beam member 34. The two resilient pole guard sections 10 are joined together using dove tail grooves 14 and dove tail tongues 12 to matingly interengage the two resilient pole guard sections 10 after folding the two resilient pole guard sections 10 along hinge forming channels 16. This interengagement defines a longitudinally extending rectangular hollow space for disposing a rectangular member therein, such as I-beam member 34, in order to sheath I-beam member 34 and to protect vehicles which strike I-beam member 34 from damage.

It will be understood that knock out plugs 18 may be left in their holes 20 because there is no need to remove knock out plugs 18 when forming a rectangular space which is substantially the correct size for sheathing a rectangular member such as I-beam member 34. It will be also understood by those skilled in the art that a plurality of resilient pole guard sections 10 in excess of two resilient pole guard sections 10 may be interengaged by means of dove tail grooves 14 and dove tail tongues 12 in order to surround a larger extending member, wherein the resilient pole guard sections 10 are not necessarily folded on all hinge forming channels 16. Further, it will be understood by those skilled in the art that other means of interengaging and interlocking a plurality of resilient pole guard sections 10 to each other may be used to surround an extending member and that the invention in any of its embodiments is not limited to resilient pole guard sections 10 provided with dove tail grooves 14 and dove tail tongues 12.

Figures 5, 6:
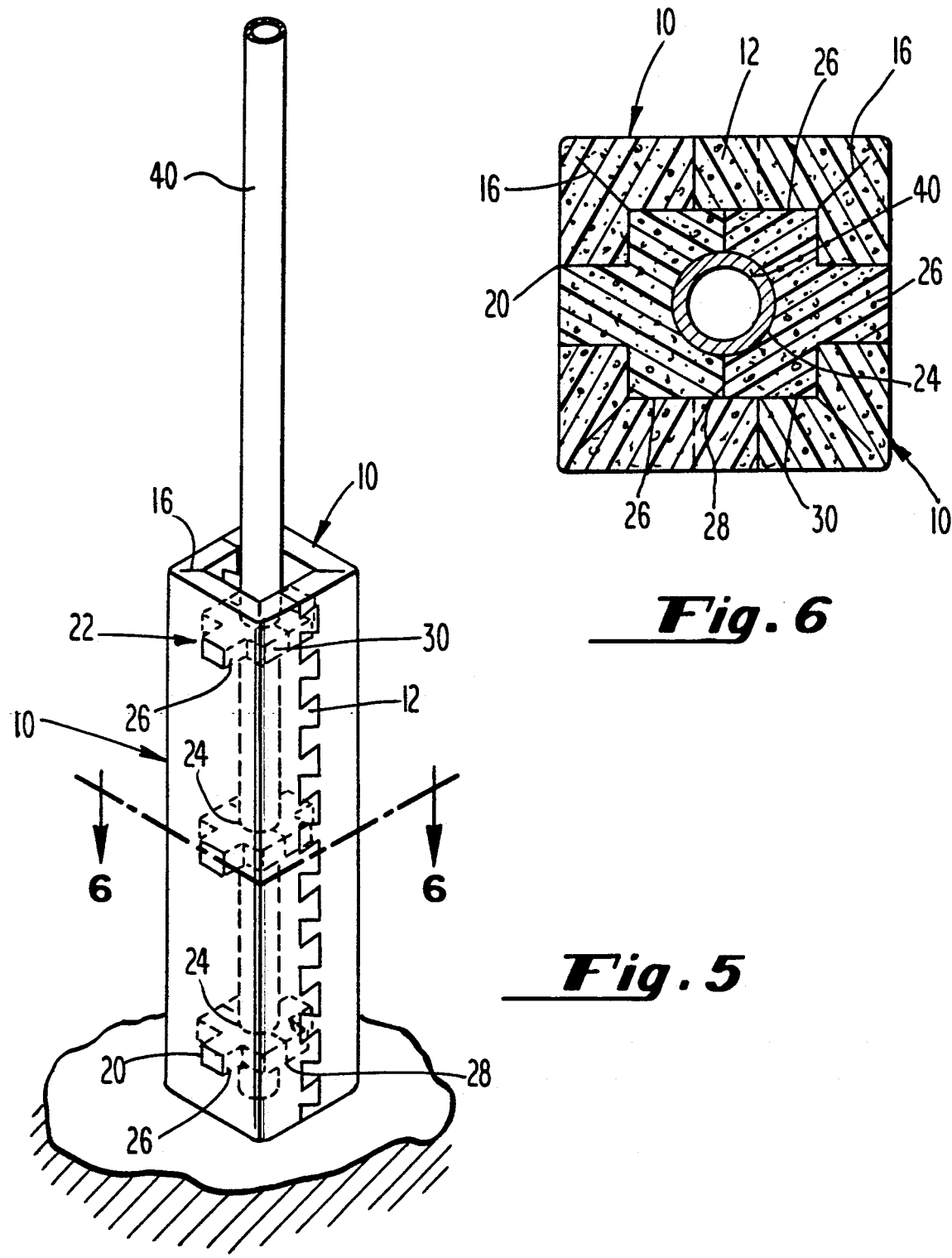
FIG. 5 shows two sheathing sections of the present invention as shown in FIG. 1 joined together along two longitudinal seams to surround a pipe or tubular member having a circular cross section.
FIG. 6 shows the a cross-sectional representation of the two sheathing sections of the present invention joined together along two longitudinal seams to surround the pipe or tubular member of FIG. 5.

Referring now to FIGS. 5, 6, there is shown a perspective view of two resilient pole guard sections 10 joined together along two longitudinal seams to surround a pipe member 40 or a tubular member 40 as well as a cross sectional representation of the pole guard sections 10 surrounding pipe 40 or tube 40. In this embodiment, knock out plugs 18 are removed from holes 20 to permit insertion of shafts 26 of inserts 22 or braces 22 into holes 18 thereby friction fitting and firmly securing inserts 22 to resilient pole guard sections 10.

The shoulders of insert 22 at the end of shaft 26 rest against the inner surface of resilient pole guard sections 10 when shafts 26 of inserts 22 are fully inserted into hole 20. Side faces 30 of inserts 22 also press against the inner surface of resilient pole guard sections 10 when resilient pole guard sections 10 are folded along hinge forming channels 16.

Additionally, inward facing surfaces 28 of two opposing inserts 22 abut each other causing semicircular channels 24 of two opposing inserts 22 form a ring for surrounding tubular member 40. The ring thus formed braces the walls of the sheathing formed by pole guard sections 10 are therefore braced against tubular member 40.

Thus the entire rectangular cross section defined by two interengaged resilient pole guard sections 10 between the inner surfaces of resilient pole guard sections 10 and the outer surface of tubular member 40 is completely filled by the two opposing inserts 22 thereby bracing resilient pole guard sections 10 against tubular member 40. The bracing of resilient pole guard sections 10 using inserts 20 is provided at a plurality of locations along the longitudinal length of the space defined by the two interengaged resilient pole guard sections 10.

Thus resilient pole guard sections 10, which define a central hollow space which is rectangular in cross section is adapted to sheath an extending member having a circular cross section, such as a pipe member or a tubular member, by means of a plurality of inserts 22. Resilient pole guard sections 10, along with inserts 22, therefore provide the efficiency of permitting the same sheathing structure to be use for extending members having either rectangular cross sections or circular cross sections.

In a typical embodiment the length of shaft 26 of brace 22 may be two and three sixteenths of an inch and the distance from the shoulder at the end of shaft 26 to inward facing surface 28 may be approximately three and one eighth inches. The distance between opposite side faces 30 of a insert 22 can be approximately six inches and the rectangular cross section of the sheath formed by the interlocking two resilient pole guard sections 10 can be approximately six inches by six inches. The radius of semicircular channel 24 can be approximately one and a half inches.

It will be understood that the various changes in the details, material, dimensions and arrangement of the parts which have been described and illustrated in order to explain the nature of this invention, may be made by those skilled in the art without departing from the principle and scope of the invention as expressed in the following claims.

I claim:

1. A pole guard which is adaptable for poles having either a rectangular or a circular cross-section, said pole guard comprising at least two interlocking sections, wherein each of said sections comprises:

(a) a substantially rectangular sheet of resilient sheathing material, having along each of its two longer sides a means for interlocking the section with another identical section, and having on one rectangular face a pair of hinge channels which are inset from and parallel to said longer sides, said hinge channels being spaced apart from each other a distance which is twice as great as the distance which each channel is inset from its closest longer side;

(b) said hinge channels being adapted to allow the section to be folded at each channel such that the portion between the channel and its closest longer side extends at substantially a right angle to the portion between the two channels, whereby the section can be folded at the channels and locked to one or more identical sections to form a resilient pole guard having a rectangular hollow interior; and (c) a plurality of plugs evenly spaced along the longitudinal centerline of the section, adapted to be removed and replaced by inserts which form semi-circular channels in the hollow interior to receive poles having a circular cross section.

2. A pole guard as in claim 1, wherein the means for interlocking the sections comprises a series of alternating dove-tailed grooves and tongues.

3. A pole guard as in either claim 1 or claim 2, further comprising a plurality of inserts adapted to have one end thereof inserted into the section in place of a removed plug and an opposite end thereof adapted to form a semi-circular channel.

* * * * *